(12) United States Patent
Gardetto

(10) Patent No.: US 8,132,606 B2
(45) Date of Patent: Mar. 13, 2012

(54) RUN-FLAT SUPPORT SYSTEM FOR A PNEUMATIC TIRED WHEEL AND METHOD FOR INSTALLING SAME

(75) Inventor: William W. Gardetto, Colleyville, TX (US)

(73) Assignee: Defense Venture Group, Indian Land, SC (US)

(*) Notice: Subject to any disclaimer, the term of this patent is extended or adjusted under 35 U.S.C. 154(b) by 785 days.

(21) Appl. No.: 12/054,252

(22) Filed: Mar. 24, 2008

(65) Prior Publication Data

US 2008/0163968 A1    Jul. 10, 2008

Related U.S. Application Data

(63) Continuation of application No. 11/100,300, filed on Apr. 6, 2005, now Pat. No. 7,347,241.

(60) Provisional application No. 60/559,856, filed on Apr. 6, 2004.

(51) Int. Cl.
*B60C 17/04* (2006.01)
(52) U.S. Cl. ........................................ 152/396; 152/520
(58) Field of Classification Search ................ 152/158, 152/396, 400, 516, 520, DIG. 10, 397, 398
See application file for complete search history.

(56) References Cited

U.S. PATENT DOCUMENTS

| | | | |
|---|---|---|---|
| 1,170,225 A | 2/1916 | Dillmore | |
| 1,293,746 A * | 2/1919 | Foley | 301/40.2 |
| 1,524,925 A * | 2/1925 | Furrey | 301/40.1 |
| 2,165,810 A | 7/1939 | Paselk | |
| 2,678,675 A * | 5/1954 | Crowder | 152/313 |
| 2,844,180 A | 7/1958 | Omeron | |
| 2,989,108 A | 6/1961 | Gore | |
| 3,025,898 A | 3/1962 | Opel | |
| 3,028,900 A | 4/1962 | Lee | |
| 3,827,792 A * | 8/1974 | Hollins | 152/319 |
| 3,828,836 A | 8/1974 | Bradley | |
| 3,968,825 A | 7/1976 | Mitchell et al. | |
| 3,990,491 A * | 11/1976 | Hampshire et al. | 152/158 |
| 4,059,138 A | 11/1977 | Mirtain et al. | |
| 4,085,786 A | 4/1978 | Caravito | |
| 4,102,379 A * | 7/1978 | Kamiya | 152/405 |
| 4,157,107 A | 6/1979 | Cataldo | |
| 4,169,496 A | 10/1979 | Cataldo | |
| 4,183,388 A | 1/1980 | Cassidy | |
| 4,202,393 A | 5/1980 | Ikeda et al. | |
| 4,231,410 A * | 11/1980 | Vannan, Jr. | 152/452 |
| 4,257,467 A | 3/1981 | Van der Burg | |
| 4,281,700 A | 8/1981 | Ross | |
| 4,346,747 A | 8/1982 | Osada et al. | |

(Continued)

FOREIGN PATENT DOCUMENTS

DE    3818648 A1 *    7/1989

(Continued)

*Primary Examiner* — Jason Bellinger
(74) *Attorney, Agent, or Firm* — Choate, Hall & Stewart LLP; Christopher D. Agnew; Daniel S. Matthews

(57) ABSTRACT

A run-flat support system and method for installing the same are disclosed. In one embodiment, the run-flat support system includes a torque assembly removably coupled to a split wheel rim of a pneumatic tired wheel. A plurality of support segments are adapted for attachment to the torque assembly in order to support the pneumatic tired wheel in a flat condition such as an under-inflated condition or deflated condition.

7 Claims, 15 Drawing Sheets

U.S. PATENT DOCUMENTS

| | | | |
|---|---|---|---|
| 4,424,842 A | 1/1984 | Trebaol | |
| 4,428,411 A | 1/1984 | Markow et al. | |
| 4,505,314 A * | 3/1985 | Goudy | 152/398 |
| 4,572,260 A | 2/1986 | Ordu | |
| 4,573,509 A | 3/1986 | Smith et al. | |
| 4,673,014 A | 6/1987 | Markow | |
| 4,709,738 A | 12/1987 | Goodell et al. | |
| 4,794,966 A | 1/1989 | Markow | |
| 4,823,854 A | 4/1989 | Payne et al. | |
| 4,854,356 A | 8/1989 | Koutsoupidis | |
| 4,989,657 A * | 2/1991 | Lipper | 152/399 |
| 5,000,241 A | 3/1991 | Patecell | |
| 5,012,849 A | 5/1991 | Ko | |
| 5,215,137 A | 6/1993 | Weeks et al. | |
| 5,660,653 A | 8/1997 | Gardetto | |
| 5,772,805 A | 6/1998 | Bobst | |
| 6,109,319 A | 8/2000 | Gardetto | |
| 6,523,587 B2 | 2/2003 | Gregory | |
| 7,261,134 B2 | 8/2007 | Chen | |
| 7,347,241 B2 * | 3/2008 | Gardetto | 152/396 |
| 7,398,809 B2 * | 7/2008 | Steinke et al. | 152/400 |
| 2005/0217781 A1 | 10/2005 | Gardetto | |

FOREIGN PATENT DOCUMENTS

| | | | |
|---|---|---|---|
| EP | 0490585 | | 6/1992 |
| EP | 0569710 | | 11/1993 |
| JP | 60213508 A | * | 10/1985 |
| JP | 03231007 A | * | 10/1991 |
| JP | 06183225 A | * | 7/1994 |

* cited by examiner

RUN-FLAT SUPPORT SYSTEM FOR A PNEUMATIC TIRED WHEEL AND METHOD FOR INSTALLING SAME

PRIORITY STATEMENT & CROSS REFERENCE TO RELATED APPLICATIONS

This application is a continuation of U.S. patent application Ser. No. 11/100,300, issued as U.S. Patent No. 7,347,241 on Mar. 25, 2008, entitled "Run-flat Support System for a Pneumatic Tired Wheel and Method for Installing Same" and filed on Apr. 6, 2005, in the name of William W. Gardetto; which claims priority from provisional U.S. patent application Ser. No. 60/559,856, entitled "Run-flat Support and Torque Ring Anchoring Apparatus for Pneumatic Tired Wheel" and filed on Apr. 6, 2004, in the name of William W. Gardetto; both of which are hereby incorporated by reference for all purposes.

STATEMENT REGUARDING FEDERALLY SPONSERED RESEARCH AND DEVELOPMENT

The U.S. Government has a paid-up license in this invention and the right in limited circumstances to require the patent owner to license others on reasonable terms as provided for by the terms of Cooperative Research and Development Agreement TARDEC CRADA #04-15 awarded by the Department of the Army.

TECHNICAL FIELD OF THE INVENTION

This invention relates, in general, to pneumatic tires for on and off road vehicles and, in particular, to a run-flat support system having a torque assembly for a pneumatic tired wheel and a method for installing the same that supports a tire in a deflated and run-flat condition.

BACKGROUND OF THE INVENTION

Pneumatic tired wheels are widely used in virtually all types of land vehicles, including automobiles, trucks, trailers, tractors, and other self propelled and unpowered vehicles, and aircraft landing gear. The intense development activities involving pneumatic tired wheels and tires has resulted in a highly developed state of the art with respect to tire design, composition, function and reliability.

The performance of pneumatic or gas charged tires is substantially degraded by the loss of inflation pressure. Various attempts have been made to eliminate loss of charge pressure due to tire wall puncture and provide tire designs that will enable the tire to continue to operate in a deflated or "run-flat" condition ranging from modification of tire design to introduction of materials and devices within the tire cavity to support the tire during a deflation period.

These efforts have only been partially successful and often result in limited mobility and loss of steering control and traction, serving to provide mobility for relatively short distances with further destruction of the damaged tire. Further advantages sought for these run-flat adaptations are to provide a replacement for the spare tire and eliminate the need for "on road" changing of the tire. Accordingly, efforts have been directed towards providing vehicle wheels with "run-flat" support devices that better provide vehicle stability and mobility for longer duration and quality of function.

A variety of devices have been developed that may be installed on a pneumatic tired wheel within the tire pressure cavity to support the tire when it is partially or completely deflated without substantially reducing the wheel's effective diameter so that the vehicle stability and control is not compromised. Some of these devices include single and multi-part cushion members that are disposed on the wheel rim between the tire-bead flanges and extend radially outward from wheel axis of rotation to support the tire in a deflated condition. Some of these conventional devices have been fabricated of resilient elastomeric materials of relatively complex construction and may be stretched over the wheel rim to mount on unitary or multi-part rims.

Such devices, if stiff enough to support a tire under run-flat conditions, are difficult to mount on split wheel rims due to the difference in diameter between the tire bead flanges and the interconnecting rim center portion or web. On the other hand, if these devices are resilient enough to be slipped over the bead flanges and engaged with the wheel rim in a static condition, they tend to slip and lose their support position during high speed operation due to centrifugal forces acting thereon.

Some run-flat devices have been equipped with clamps to achieve position maintenance but suffer the difficulty of placement and replacement due to the necessary tight fit against the wheel. Others have been provided with projections on the inner surface of the support structure to maintain wheel contact. These also may be displaced during motion and or involve difficult mounting procedures due to the need to stretch over the wheel rim.

Other multi-component structural inserts have been bolted directly to the wheel via bolts, requiring additional bolt holes drilled into the wheel flange, potentially compromising wheel strength and integrity. The use of multi-component insert structures lessens the difficulty of introduction and/or removal of the structures into the wheel/tire cavity. However, use of "through the wheel" bolt anchors limits the number of bolts that can be anchored in the greater diameter insert structural material resulting in high load strain on the bolts within the structural insert member. Accordingly, further improvements in the field of run-flat support systems are required.

SUMMARY OF THE INVENTION

A run-flat support system and method for installing the same are disclosed. The run-flat support system may be installed on a pneumatic tired wheel within the tire pressure cavity to support the tire when it is partially or completely deflated without substantially reducing the wheel effective diameter so that the vehicle stability and control is not compromised and the vehicle operated with the tire deflated.

In one embodiment, the run-flat support system includes a torque assembly removably coupled to a split wheel rim of a pneumatic tired wheel. A plurality of support segments are adapted for attachment to the torque assembly in order to support the pneumatic tired wheel in a flat condition such as an under-inflated condition or deflated condition.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
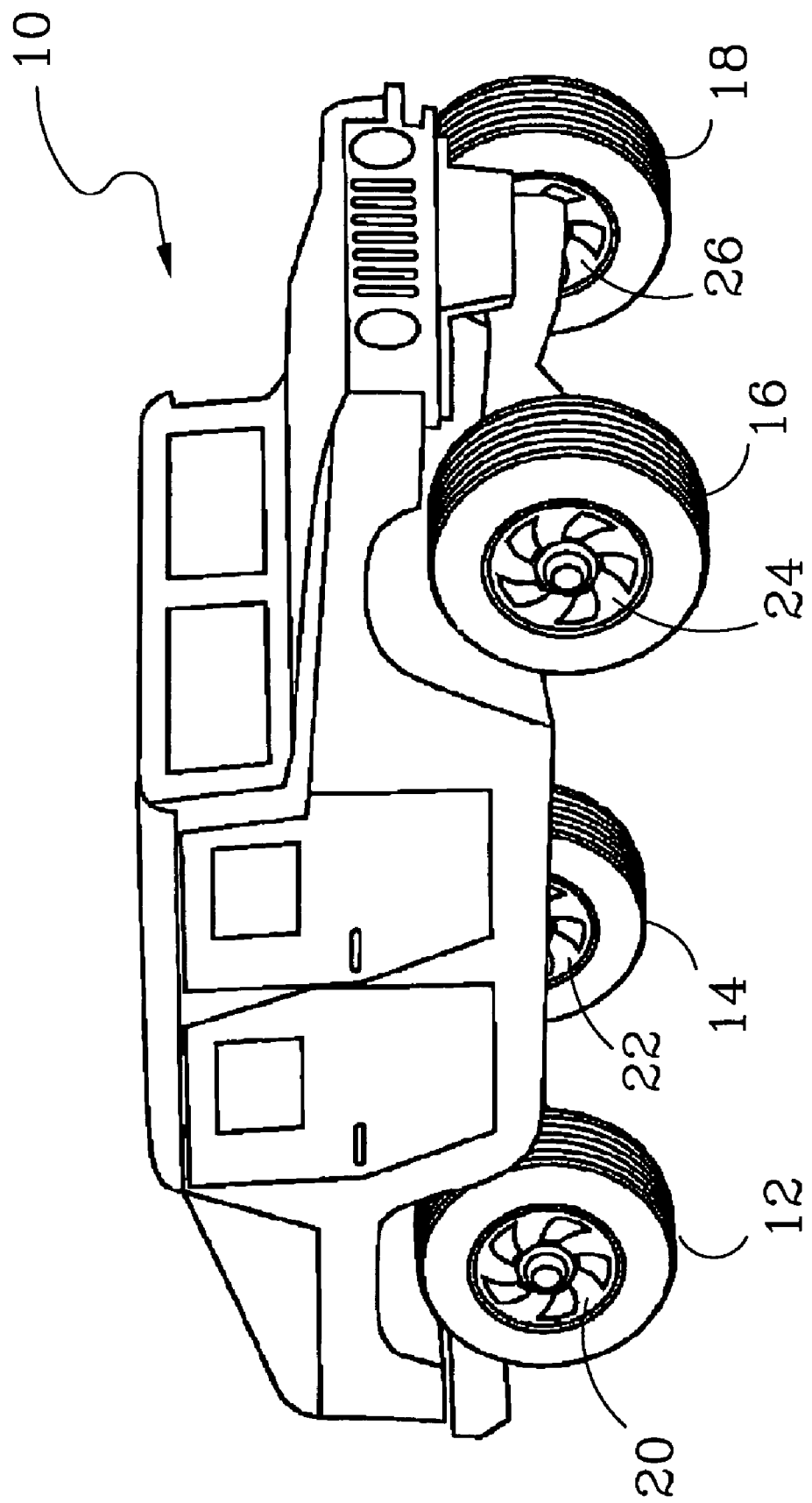
FIG. 1 depicts a front perspective view of one embodiment of a High Mobility Multipurpose Wheeled Vehicle (HMMWV), which is also known as a "Humvee", utilizing one embodiment of a run-flat support system.

Referring initially to FIG. 1, therein is depicted an HMMWV utilizing one embodiment of a run-flat support system that is schematically illustrated and generally designated 10. The HMMWV 10 is a light, highly mobile, diesel-powered, four-wheel-drive vehicle equipped with an automatic transmission. Using various common components and kits, the HMMWV 10 can be configured as a troop carrier, armament carrier, S250 shelter carrier, ambulance, TOW missile carrier, or a Scout vehicle, for example.

As illustrated, the HMMWV 10 is outfitted as a troop carrier that is extremely effective in difficult terrain regardless of road type or weather conditions. A V8, 6.2 liter displacement, fuel injection engine transfers power to drive axles and onto rear tires 12 and 14 and front tires 16 and 18 which are mounted onto split wheel rims 20, 22, 24, and 26, respectively. In one embodiment, the tires 12, 14, 16, and 18 are 37×12.50R 16.5LT radial tires and the split wheel rims 20, 22, 24, and 26 are each of a two wheel half-section design having a diameter of approximately 16.5 inches. Each tire 12, 14, 16, and 18 includes a run-flat support system to enable operation in a flat condition, i.e., when a tire is an under-inflated or deflated condition. The run-flat support system includes a positive locking torque assembly, which is preferably ring-shaped, that mechanically fastens support segments to the wheel rim, thereby increasing traction and braking during a run flat condition. Additionally, the run-flat support system provides better balance and concentricity during long periods of inflated use.

It should be appreciated that although the run-flat support system is illustrated as being utilized by an HMMWV in FIG. 1, the run-flat support system described herein may be utilized in a variety of vehicles. The run-flat support system described herein may be utilized with virtually all types of land vehicles, including automobiles, trucks, trailers, tractors, and other self propelled and unpowered vehicles, and aircraft landing gear. Moreover, it should be appreciated that tires of all sizes including both radial ply and bias ply tires as well as wheel rims of all sizes are within the teachings of the present invention. A general discussion of run-flat support systems and their applicability may be found in either of the following United States patents: U.S. Pat. No. 5,660,653 entitled "Run-flat Support for Pneumatic Tired Wheel" issued on Aug. 26, 1997 in the name of William W. Gardetto, or U.S. Pat. No. 6,109,319 entitled "Run-flat Support for Pneumatic Tired Wheel" issued on Aug. 29, 2000 in the name of William W. Gardetto; both of which are hereby incorporated by reference for all purposes.

Figure 2:
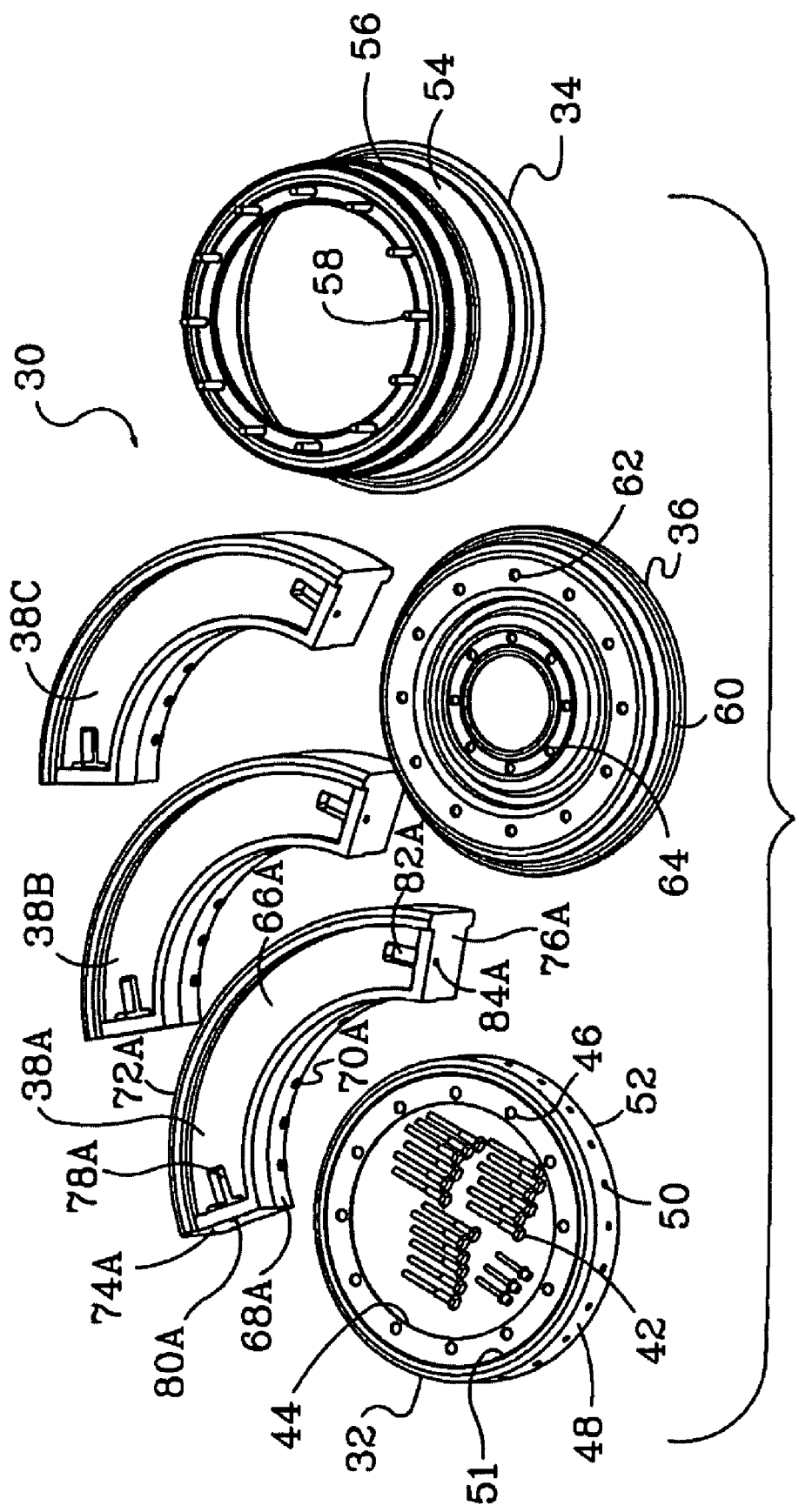
FIG. 2 depicts a front perspective view of one embodiment of the unassembled components of a run-flat support system.

FIG. 2 depicts one embodiment of the unassembled components of a run-flat support system 30. The unassembled components include a torque assembly 32, a split wheel rim as represented by rims 34 and 36, three support segments 38A, 38B, and 38C, and fasteners 42. When assembled, these components are installed to provide run-flat capability to a pneumatic tired wheel.

The torque assembly 32 includes a substantially circular body 44 having multiple mounting holes 46 therethrough. In one implementation, the circular body 44 is approximately 16" in diameter and includes 12 evenly spaced mounting holes 46. The mounting holes 46 provide for the attachment of the torque assembly 32 to rims 34 and 36. A peripheral flange 48 is coupled to an outer edge of the substantially circular body 44. In one implementation, the substantially circular body 44 and the peripheral flange 48 are integral. A series of coupling holes 50 are spaced around the peripheral flange 48 for fastening the support segments 38A, 38B, and 38C to the torque assembly 32. In one implementation, 16 evenly spaced coupling holes are used to provide 8 coupling holes per $\pi$ radians of peripheral flange 48. The peripheral flange 48 is grooved to seat an "O" ring seal 51 that provides a substantially airtight pneumatic cavity. Further, an edge 52 has a shape that complements rim 34 to ensure a formed fit.

The rim 34 includes a body 54 and a drop-center surface 56 that accepts the edge 52 of torque assembly 32 so that a flush fit is formed therebetween. Mounting studs 58 extend from body 54. Preferably, a one-to-one correspondence exits between mounting holes 46 and mounting studs 58 such that equal numbers of mounting holes 46 and mounting studs 58 are present and the mounting studs 58 are spaced to mate with the mounting holes 46.

The rim 36 includes a body 60 having mounting holes 62 and 64 therethrough. Mounting holes 62 correspond to mounting studs 58 such that torque assembly 32 via mounting holes 46 is interposed between rims 34 and 36. Mounting holes 64 provide for the attachment of the run-flat support system 30 to an axle of a vehicle.

Support segments 38A, 38B, and 38C are adapted for attachment to the torque assembly 32 in order to provide support for the pneumatic tired wheel during a flat condition. With respect to support segment 38A, a body 66A of sufficient hardness is included to maintain shape under load. Inner radial surface 68A of support segment 38A conforms to peripheral flange 48 and includes coupling holes 70A therethrough. The coupling holes 70A are spaced to align with coupling holes 50 of torque assembly 32 such that fasteners 42 can be employed to secure the support segment 38A to the torque assembly 32. A crown member 72A of the body 66A is opposite the inner radial surface 68A. In operation, the crown member 72A engages an inner wall of the pneumatic tired wheel during a flat condition to support the wheel and associated load to provide continued mobility.

Radial end members 74A and 76A provide for an end-to-end mating engagement between the support segments 38A, 38B, and 38C. More specifically, the radial end member 74A includes a recess 78A and a passageway 80A. Similarly, the radial end member 76A includes a recess 82A and a passageway 84A. In operation, when radial end members of different support segments abut, the passageways align and the recesses provide for the insertion of a fastener such as a bolt, lug nut, and washer. It should be appreciated that the use of recesses and passageways is not required by the present invention. For example, in another embodiment, radial end members of adjacent support segments may include complementary male and female portions that are operable to be disposed in mating engagement when positioned for coupling to the torque assembly. The components described herein, such as the torque assembly 32 and support segments 38A, 38B, and 38C may be manufactured from aluminum, steel, a composite material, elastomer or other material that meets the requisite load and strength requirements. It should be understood that corresponding parts of the support segments 38A, 38B, and 38C have the same number with an identifying letter, i.e., A, B, or C. Moreover, it should be appreciated that in particular embodiments, the support segments are not symmetrical as suggested by this numbering convention.

Figure 3:
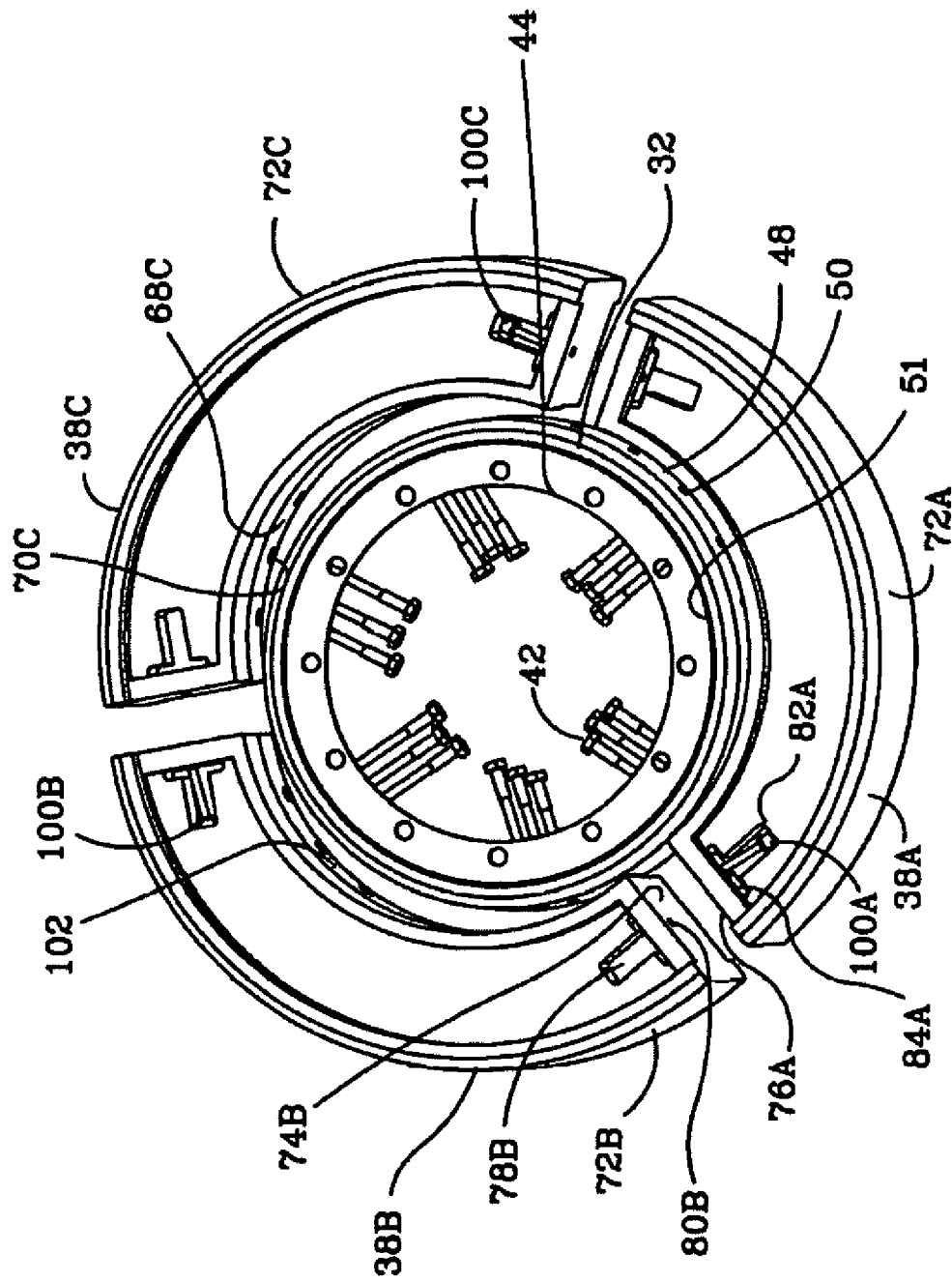
FIGS. 3-13 depict front perspective views of the components of the run-flat support system of FIG. 2 being assembled and installed in a split wheel rim of a pneumatic tired wheel.
Figure 4:
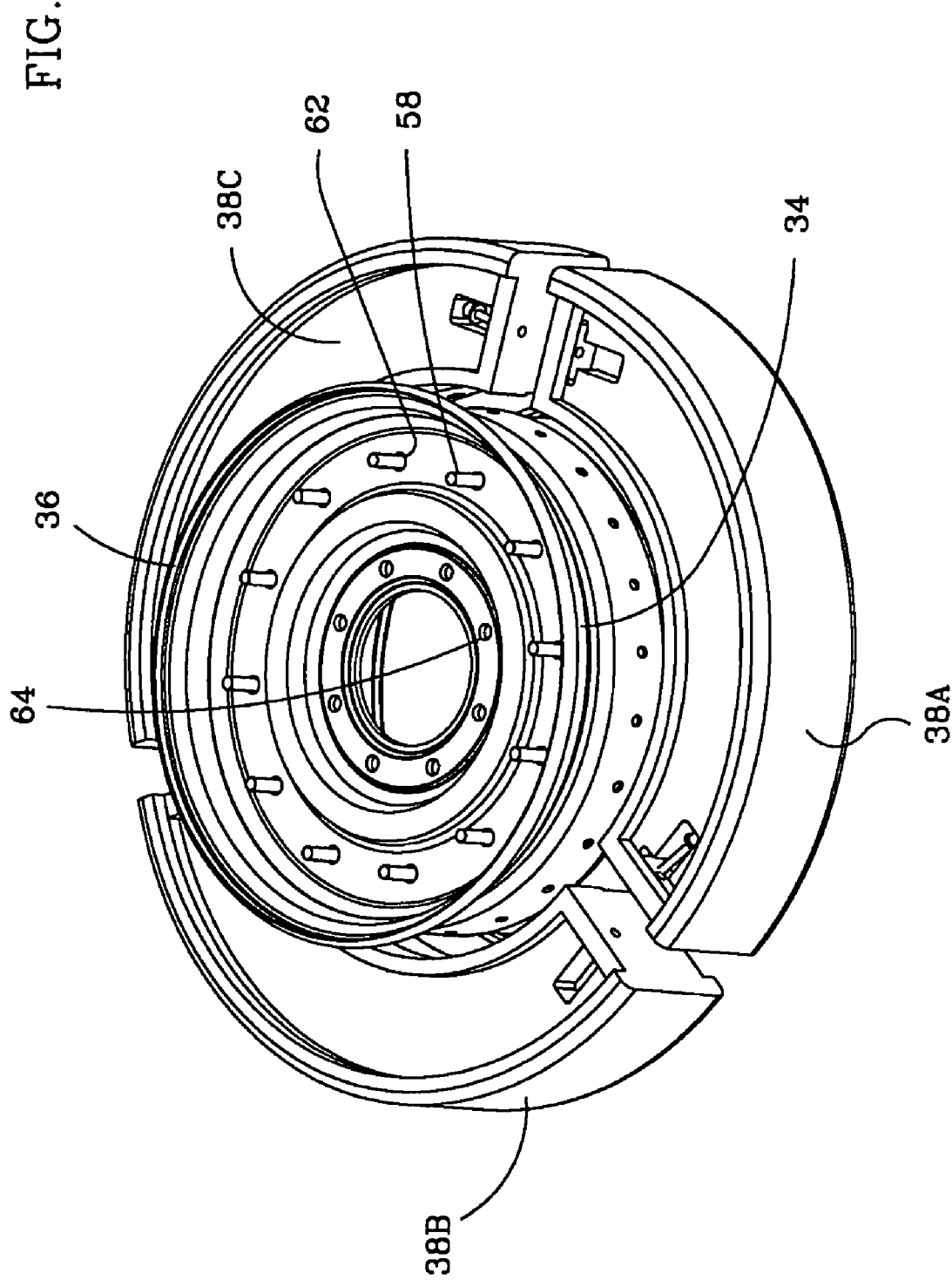

FIGS. 3-13 depict the components of the run-flat support system 30 of FIG. 2 being assembled and installed in the split wheel rim of a pneumatic tired wheel. More specifically, FIGS. 3-4 present the assembly of the run-flat support system 30 without the presence of the pneumatic tired wheel for purposes of explanation. FIGS. 5-13 present the assembly of the run-flat support system 30 with the pneumatic tired wheel.

In FIG. 3, support segments 38A, 38B, and 38C are positioned about the torque ring 32 such that the inner radial surfaces of the support segments are in contact with the peripheral flange 48 of the torque assembly 32 and the crowns of the support segments face the inner surface of the pneumatic tired wheel. By way of example, with reference to support segment 38C, inner radial surface 68A is being positioned against the peripheral flange 48 of the torque ring 32 so that coupling holes 70C will align coupling holes 50 and fasteners 42 may be utilized to mate the two components.

Additionally, support segments 38A, 38B, and 38C are being positioned such that radial end members of adjacent support segments align. By way of example, with reference to support segments 38A and 38B, the radial end member 76A and the radial end member 74B are being disposed in a mating engagement wherein passageways 84A and 80B align so that a fastener 100A, which is depicted as a bolt, may be inserted through the passageways 84A and 80B with the use of recesses 82A and 78A.

When the support segments 38A, 38B, and 38C are assembled in an end-to-end mating engagement with each other, they collectively form a substantially continuous tubular support structure that is operable to stabilize the tire tread during run-flat operation. This tubular support structure includes an interior circumference 102 that defines an area wherein the torque assembly is disposed. It should be understood that although the present invention is described as having three support segments, any number of support segments are permissible.

The coupling holes of the torque member 32 and the support segments 38A, 38B, and 38C as well as the mated radial end members assist in proper location and alignment of the support segments during assembly and installation, and also help maintain alignment of the support segments 38A, 38B, and 38C in response to side impact forces directed against the tire during run-flat operation. Further, the mated radial end members provide uniform load distribution against the tire and smooth running response during run-flat operation.

In FIG. 4, the torque assembly 32 is being coupled to the split wheel rim as represented by rims 34 and 36. The torque assembly 32 is seated on the rim 34 such that the edge 52 of the torque assembly 32 sits on the drop-center surface 56 of the rim 34. Further, the mounting holes 46 of the torque assembly 32 are aligned with the mounting studs 58 which are threaded therethrough. The rim 36 is superposed onto the torque assembly 32 such that the mounting holes 62 are aligned with the mounting studs 58. In this configuration, the torque assembly 32 is interposed within the split wheel rim by being removably mounted between rims 34 and 36.

Figure 5:
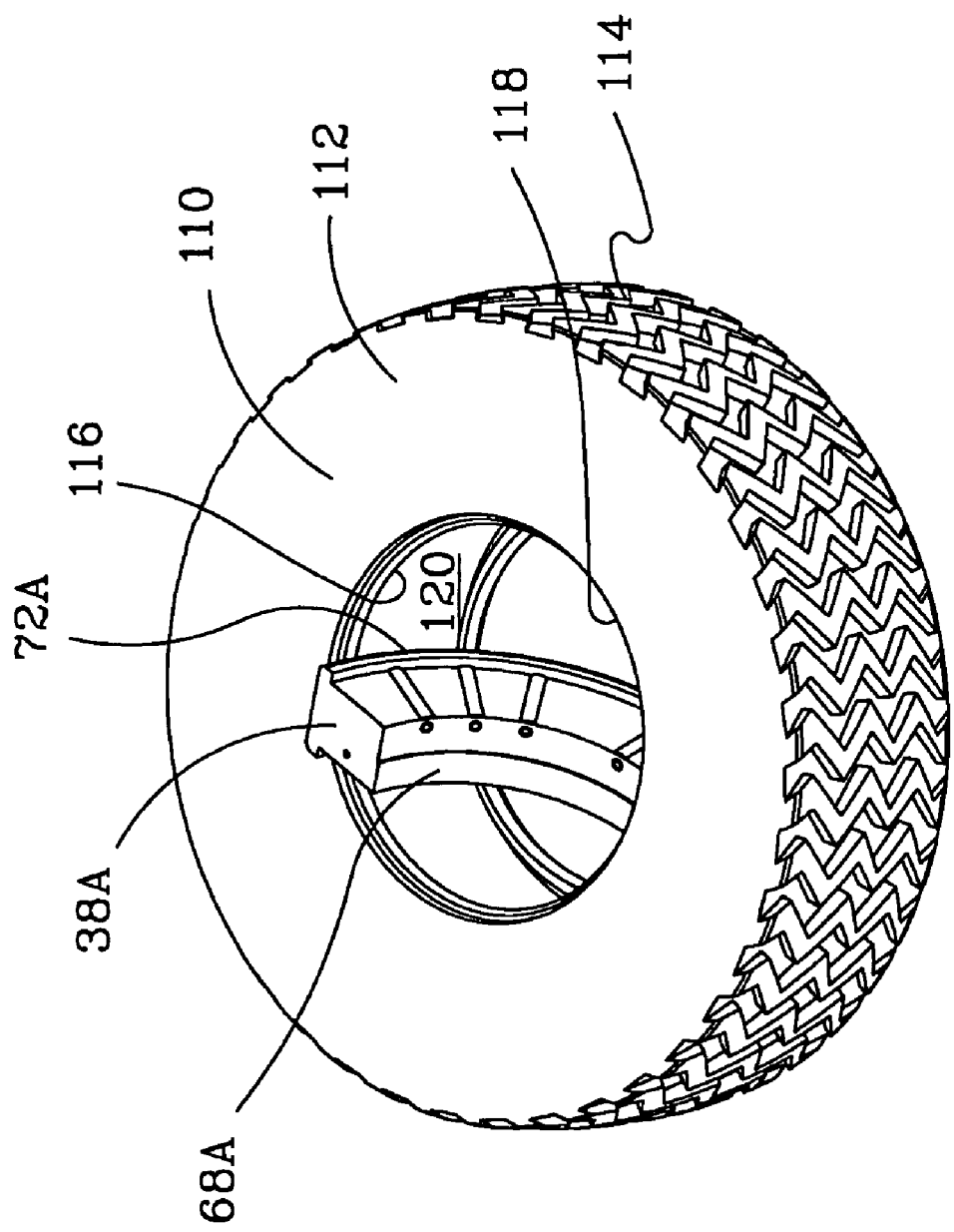

In FIG. 5, the components of FIG. 2 are being assembled and installed in the split wheel rim of a pneumatic tired wheel including tire 110 having a sidewall 112 that provides lateral stability for the tire 110, protects the inner body plies of the tire 110, and aids in maintaining the proper internal air pressure. The tire 110 also includes a tread 114 that provides traction and puncture resistance. An inner wall 116 lines the interior of the tire 110. An opening 118 is defined at the intersection of the sidewall 112 and the inner wall 116. Further, the inner wall 116 defines a tire cavity 120 for maintaining the proper internal air pressure.

Figure 6:
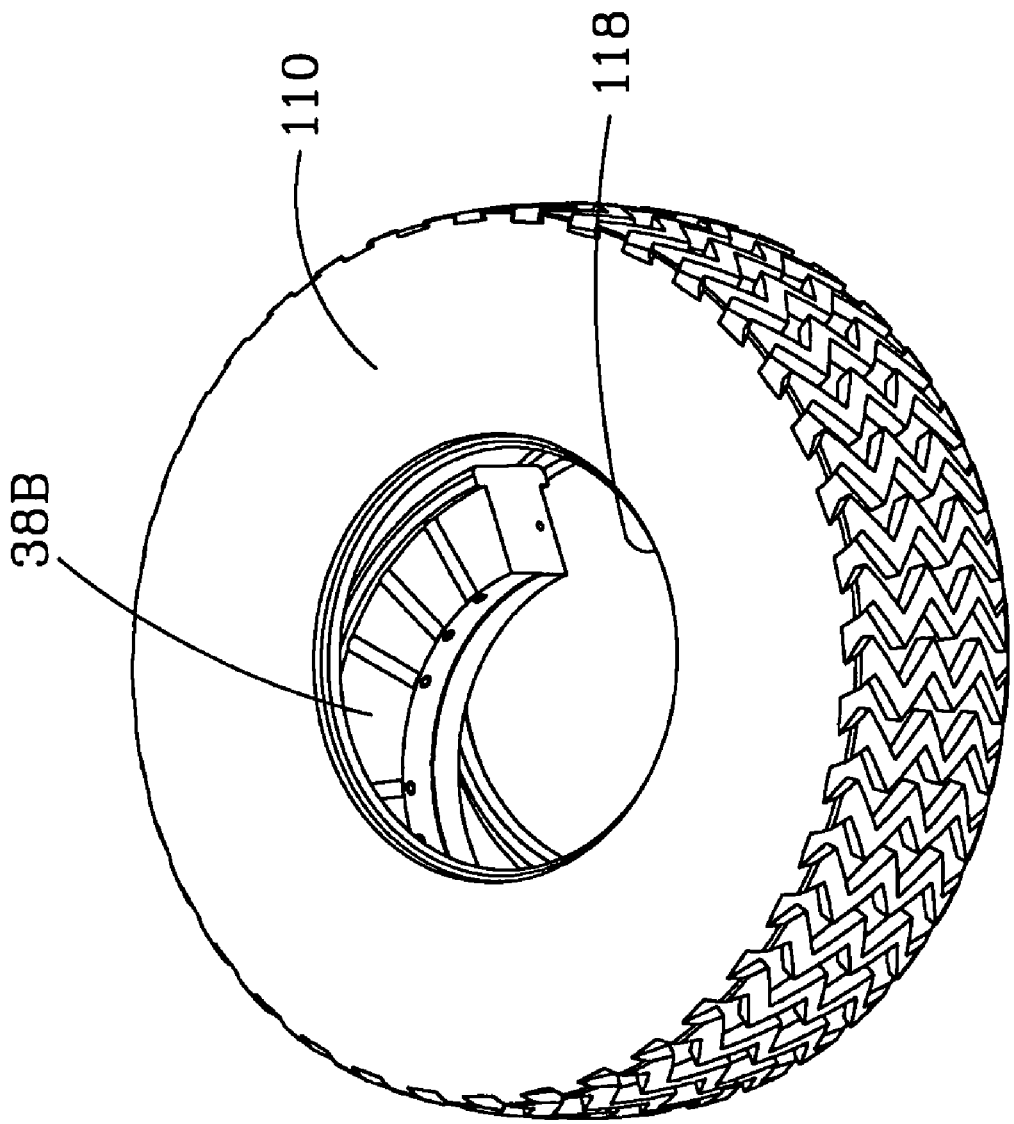

As illustrated, a first support segment, support segment 38A, is being positioned within the tire cavity 120 such that the crown member 72A faces the inner wall 116 and the inner radial surface 68A faces the geometric center of the tire 110. As depicted in FIG. 6, the next support segment, support segment 38B, is similarly positioned within the tire cavity 120 in an end-to-end mating relationship with support segment 38A. Following the insertion of the support segment 38B, the support segment 38C is also positioned within the tire cavity 120 in an end-to-end mating relationship with both support segments 38A and 38B in order that a substantially continuous tubular support structure is formed within the tire cavity 120. To aid in the installation a high/low temperature grease may be used where appropriate.

Figure 7:
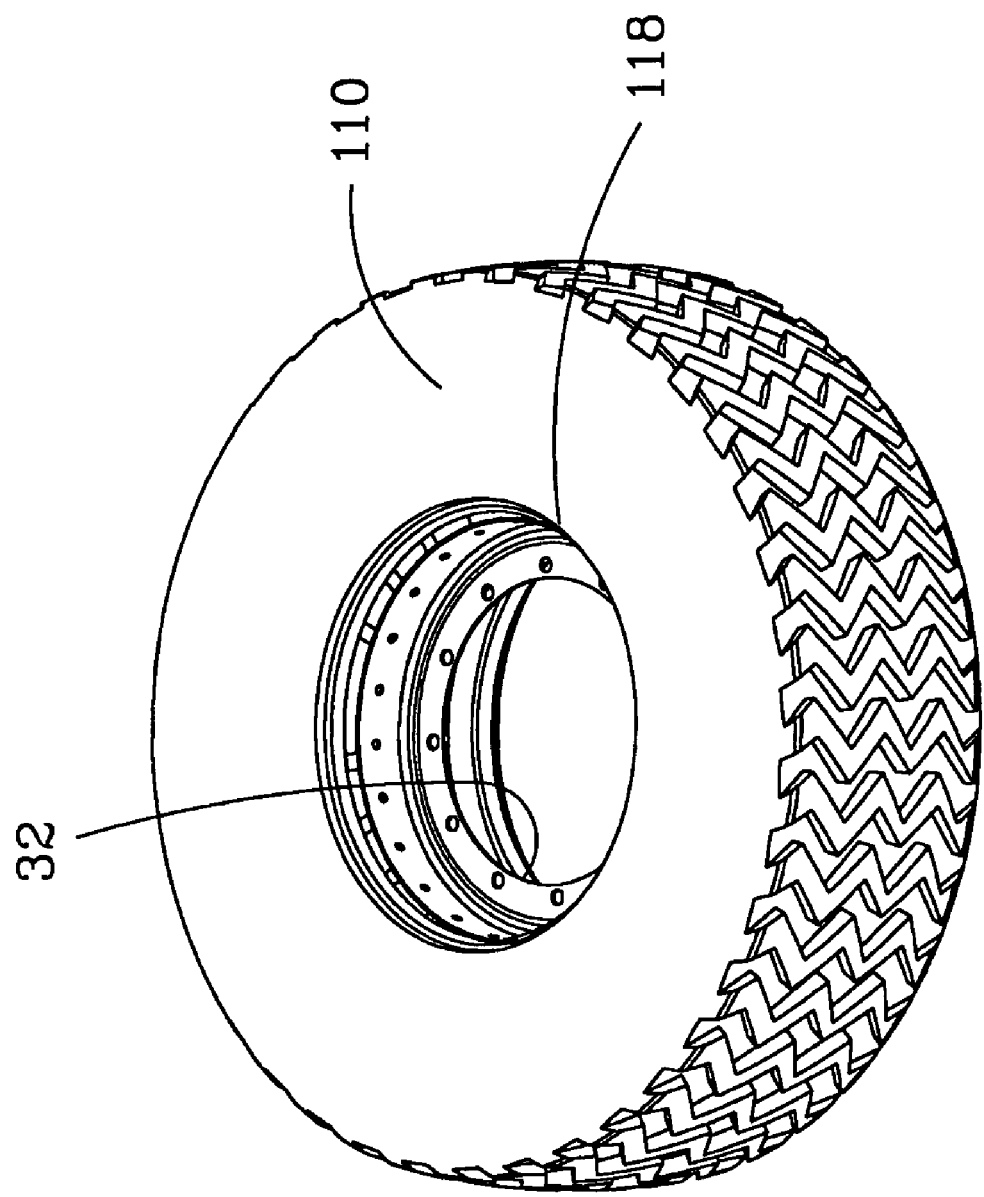
Figure 8:
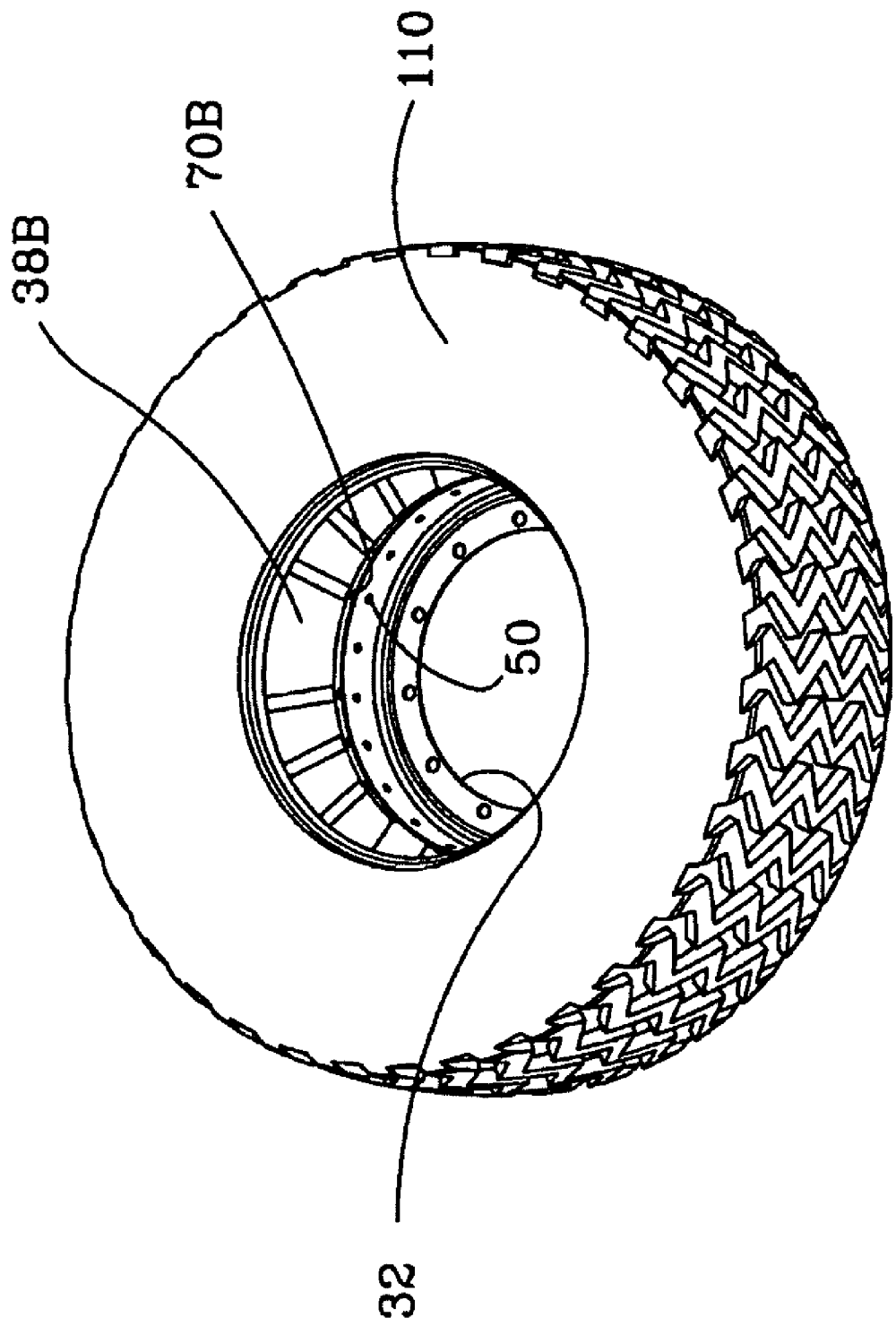
Figure 9:
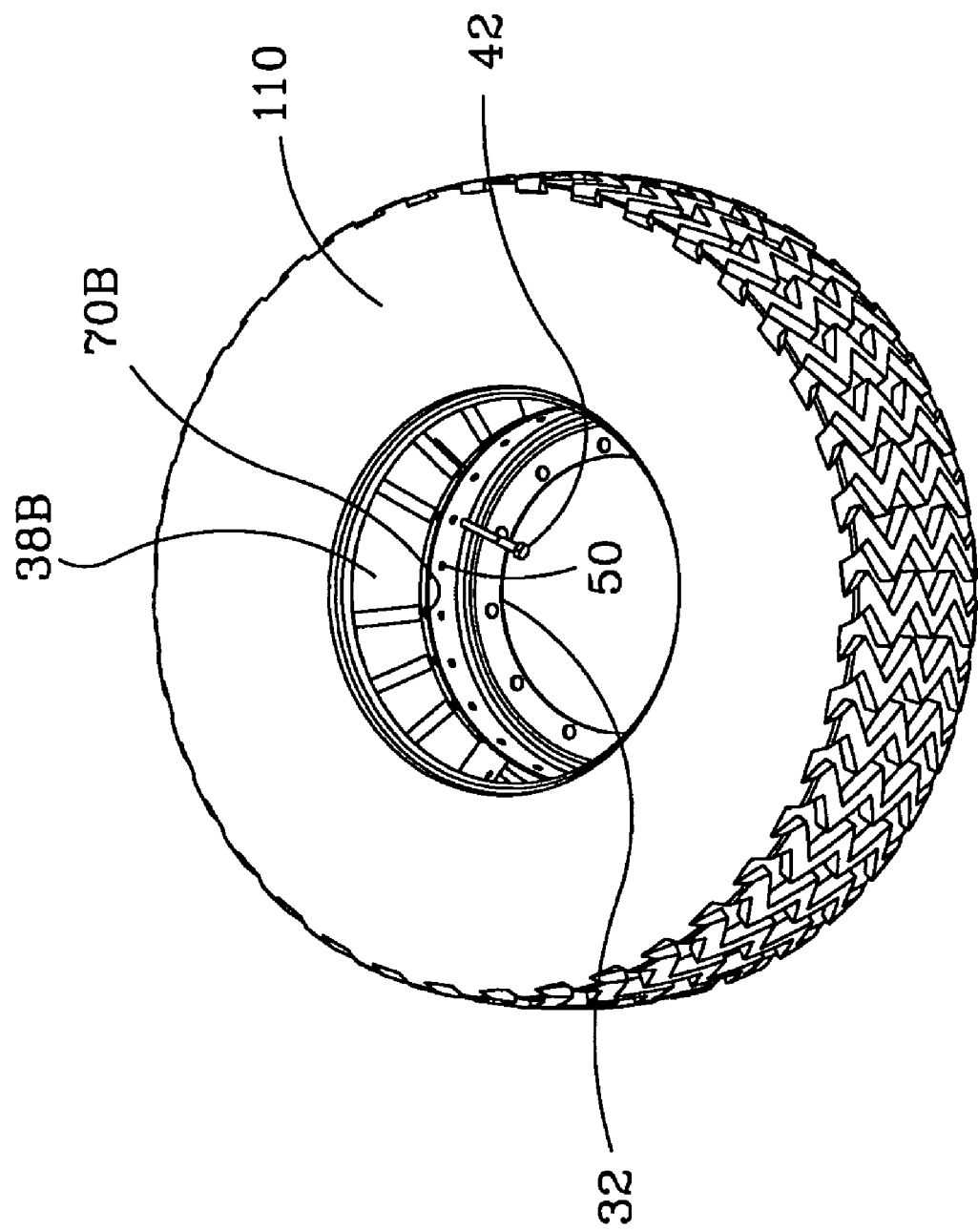
Figure 10:
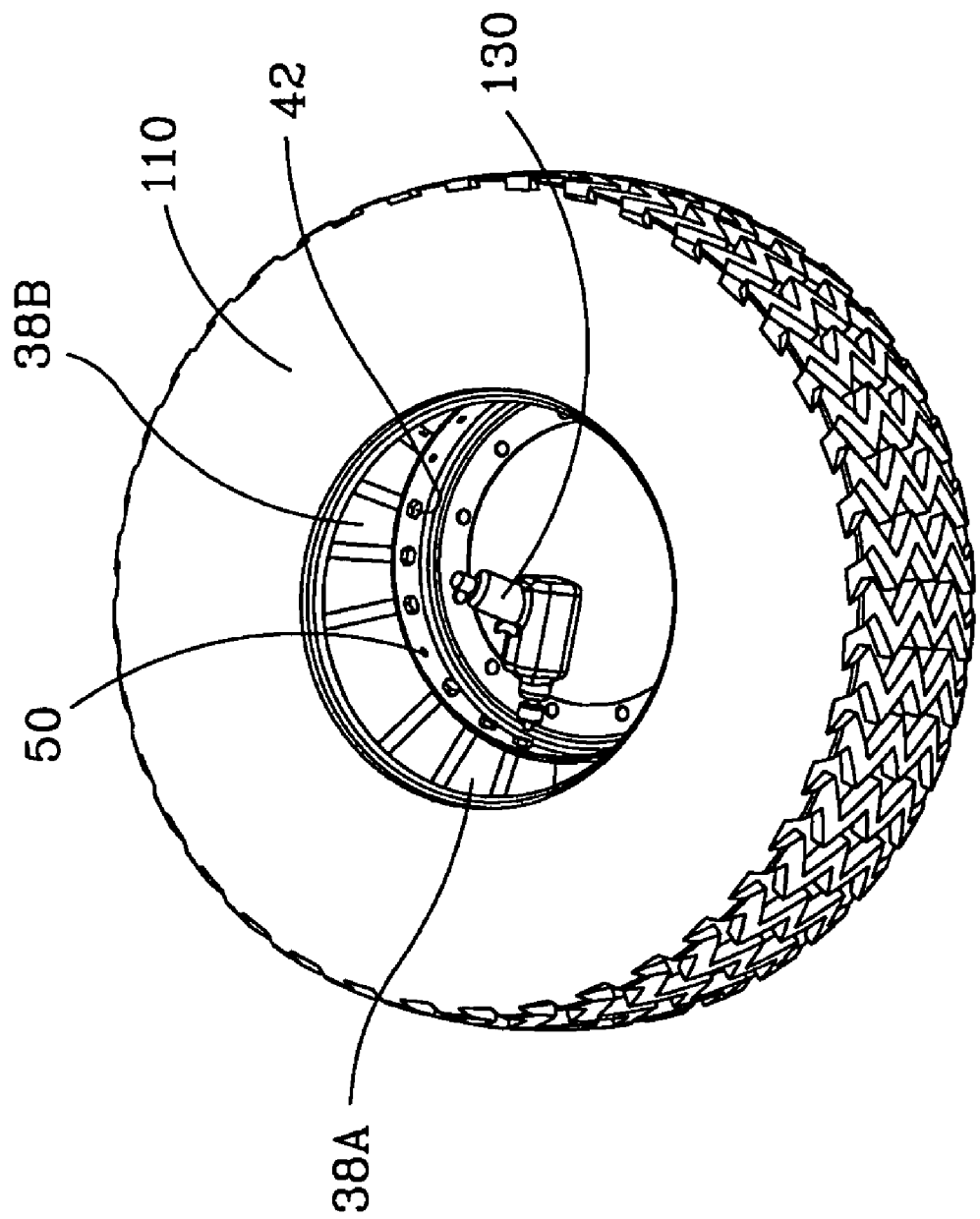

In FIG. 7, once the substantially continuous tubular support structure, as defined by support segments 38A, 38B, and 38C, is assembled within the tire cavity 120, the torque assembly 32 is disposed within the interior circumference 102 (see FIG. 3) of the tubular structure. In FIG. 8, the torque assembly 32 and the support segments 38A, 38B, and 38C are substantially concentrically positioned with the tire 110. Additionally, as previously discussed, the coupling holes 50 of the torque assembly 32 are aligned with the coupling holes 70A, 70B, and 70C of the tubular support structure. In FIG. 9, the fasteners 42 are utilized to secure the torque assembly 32 and support segments 38A, 38B, and 38C together. As depicted in FIG. 10, a tool 130, such as a hand drill, may be used by an installer to tighten the fasteners 42.

Figure 11:
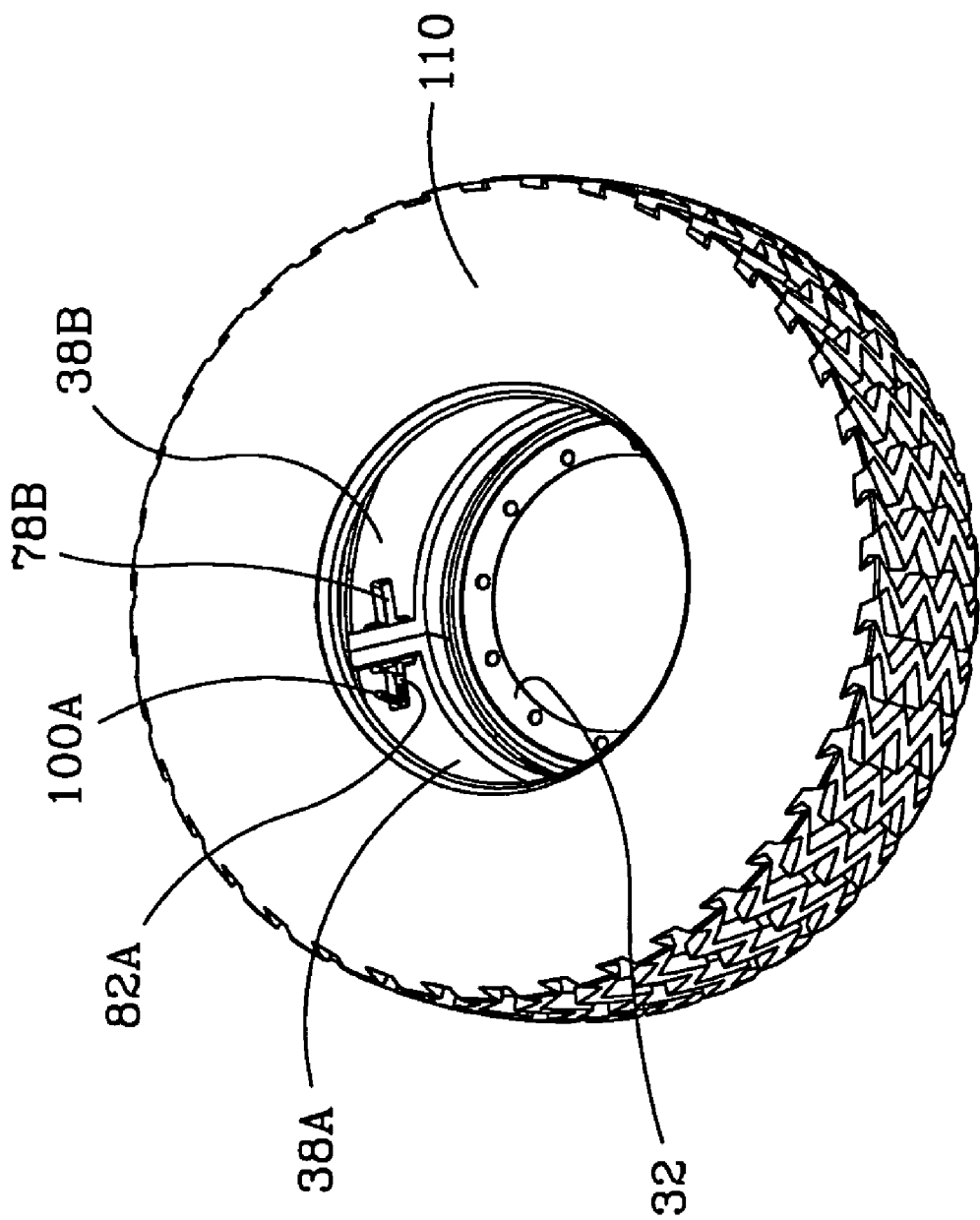
Figure 12:
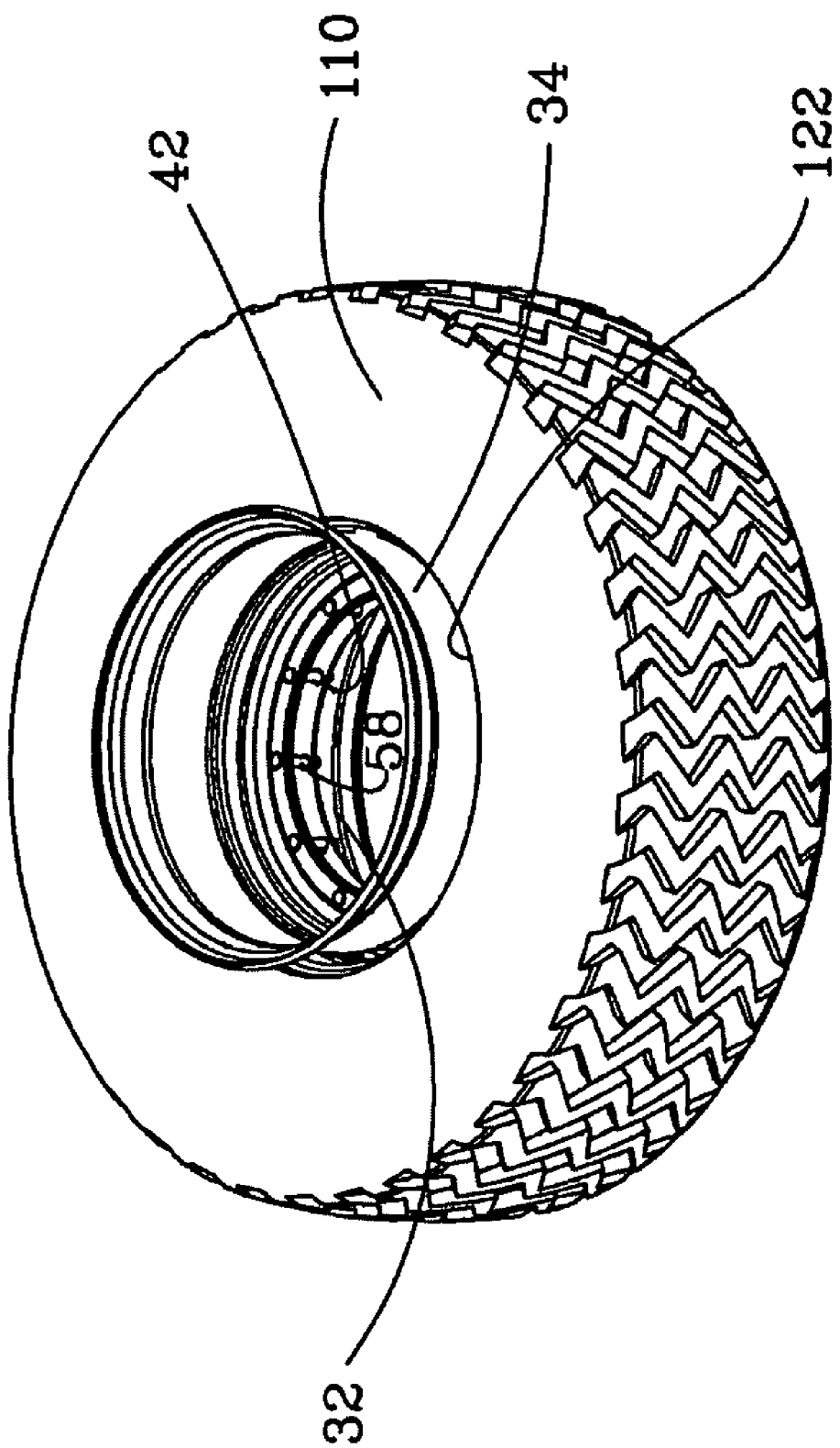
Figure 13:
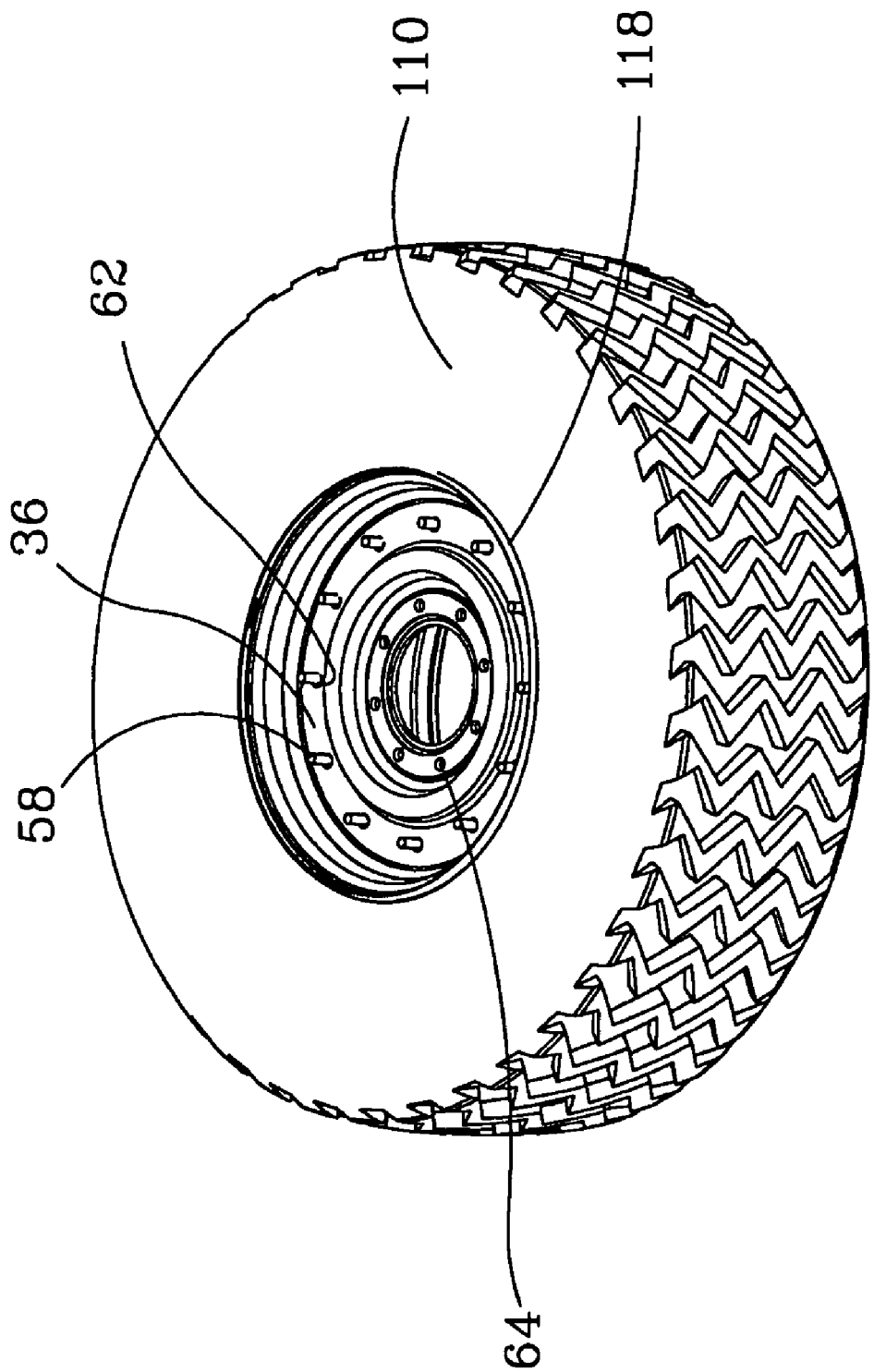

In FIG. 11, as previously discussed, the support segments 38A, 38B, and 38C are coupled together in an end-to-end mating engagement with the use of fasteners, such as fastener 100A. It should be appreciated that in certain circumstances the support segments 38A, 38B, and 38C may be coupled together prior to the securing of the torque assembly 32 and support segments 38A, 38B, and 38C. As best seen in FIG. 12, the rim 34 is being secured to the torque assembly 32. Relative to FIG. 11, in FIG. 12, the tire 110 is flipped over and the rim 34 is disposed within an opening 122 (which is analogous to opening 118) and the mounting studs 58 of rim 34 are aligned with and threaded through mounting holes 46 of the torque assembly 32. The remaining portion of the split wheel rim, rim 36, is secured to the torque assembly in FIG. 13, wherein relative to FIG. 12, the tire 110 is flipped over and returned to the position illustrated in FIG. 11 and the earlier figures.

With the tire 110 returned to this position, the mounting holes 62 are aligned with the mounting studs 58 and the rim 36 is superposed onto the torque assembly 32 such that the torque assembly 32 is interposed between the rims 34 and 36. As depicted, the exposed portions of the mounting studs 58 are able to receive tighteners, such as lug nuts and washers, to secure the split wheel rim and prepare the split wheel rim and tire 110 for mounting to an axle via mounting holes 64. It should be understood that the disassembly of the run-flat support system is accomplished in the reverse order of the methodology illustrated and described in FIGS. 5-13.

Accordingly, the run-flat support system presented herein assembles and disassembles by conventional hand tools without the need for any special equipment or extensive training. In field tests, 15 minutes were required to assemble or disassemble the run-flat support system. Further, the run-flat support system presented herein may be mounted on various types of conventional one piece, fixed or multi-part wheel rims and suitably secured as an OEM offering or by add-on retrofit installation. Additionally, with respect to assembly, in particular embodiments, the torque assembly is installed as an OEM offering and the support segments are added aftermarket.

Figure 14:
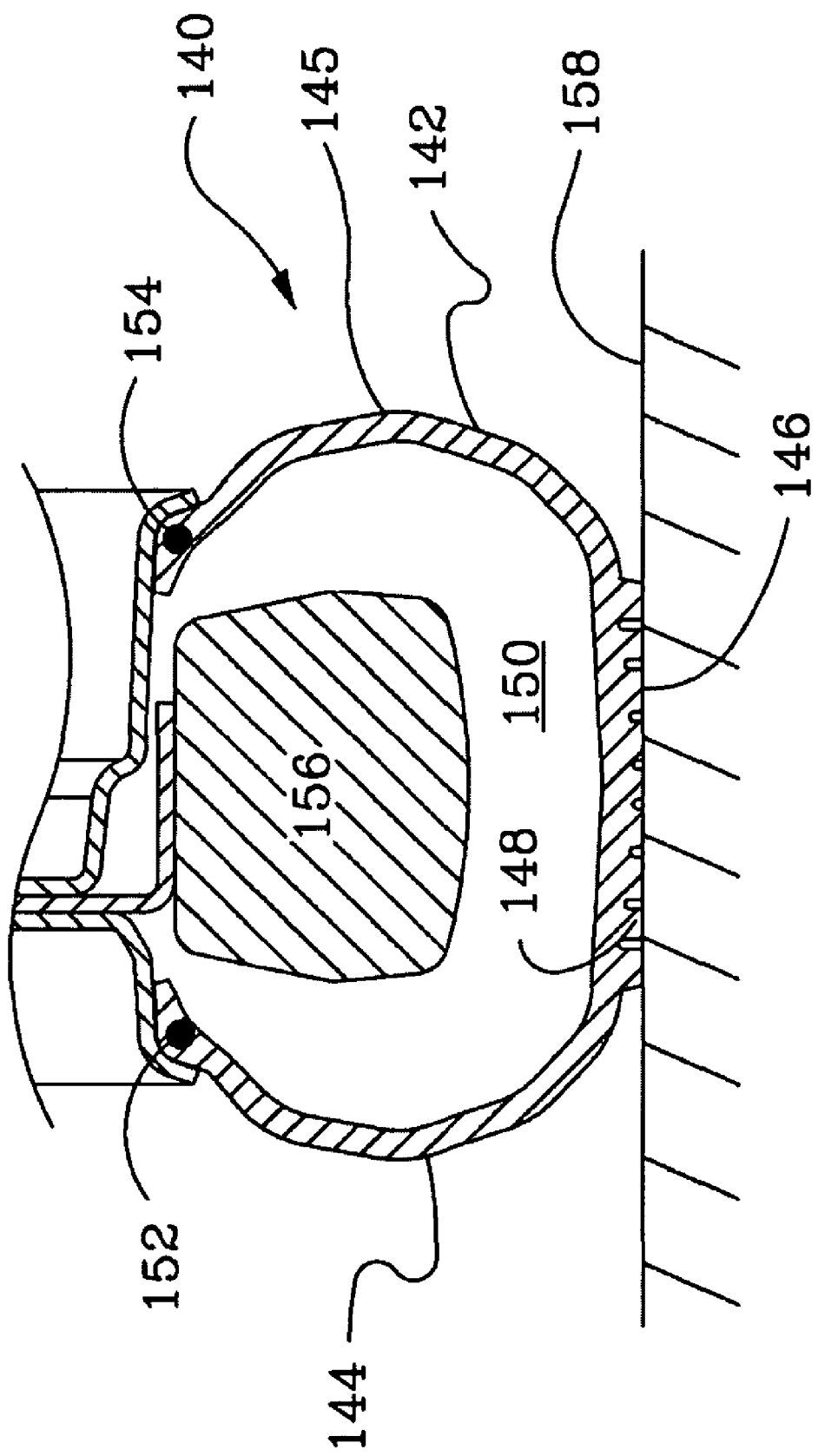
FIG. 14 depicts a cross-sectional view of one embodiment of a run-flat support system installed in a split wheel rim of a pneumatic tired wheel.

FIG. 14 depicts one embodiment of a run-flat support system 140 installed in a split wheel rim of a pneumatic tired wheel 142 which includes side walls 144 and 145, treads 146, and an inner wall 148 that defines a cavity 150. Additionally, beads 152 and 154 comprise loops of high-strength steel cables coated with rubber that provide the tire 142 the necessary strength to stay seated on the wheel rim. A support segment 156 is mounted to a torque assembly which is removably coupled to a split wheel rim. As depicted, tire 142 is properly inflated and operational. In this condition, the support segment 156 rides unobtrusively in the cavity 150.

Figure 15:
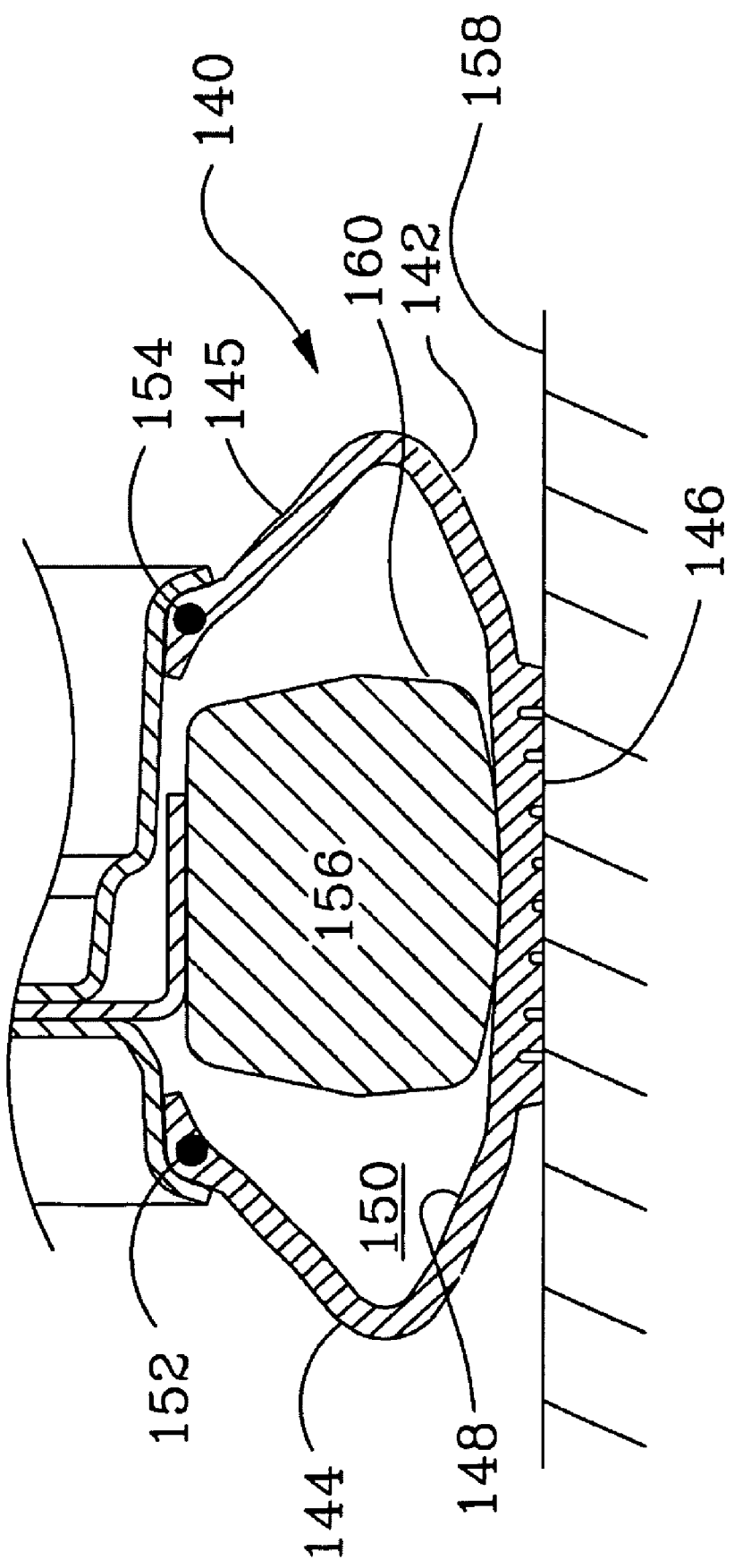
FIG. 15 depicts a cross-sectional view of the run-flat support system of FIG. 14 supporting the pneumatic tired wheel which is in a flat condition.

FIG. 15 depicts the run-flat support system 140 supporting the pneumatic tired wheel 142 which is in a flat condition. As illustrated, a crown 160 of the support segment 156 engages the inner wall 148 between the beads 152, 154 of the tire 142 in order to support the pneumatic tired wheel and the vehicle's load in a flat condition. In particular, the crown 160 maintains an operation similar to that of inflated conditions since it is substantially centered with respect to the side walls 144 and 145. The centering is maintained even during run-flat operation when relative motion occurs between the tire sidewalls 144 and 145 and the interior components occurs. It should be appreciated that the bead lock approach described herein is not required for the practice of the invention. Non-bead lock approaches which reduce the tread shoulder damage are also within the teachings of the present invention.

Testing Protocol: Federal Motor Vehicle Safety Standards (FMVSS). The run-flat support system described herein was tested in accordance with FMVSS-120, "Tire Selection and Rims for Motor Vehicles Other Than Passanger," which is a test developed by the Federal Government that is often used as a design tool by manufacturers during the development and assessment of new tire designs to determine safety and performance.

A three support segment, run-flat support system was installed on a 37×12.5R 16.5 LT Goodyear Wrangler tire and mounted on a 16.5"×8.25" split wheel rim having 12 clamp bolts with an 8 bolt circle. The tire was inflated to a cold inflated pressure of 50 PSI and prepared for a three stage test. At stage 1, a 4,000 lb load was applied to the tire and the tire was run at 42 mph for 30 minutes. At stage 2, the 4,000 lb load was maintained and the tire was run at 48 mph for 30 minutes. At stage 3, the tire was deflated and, while the 4,000 lb load was maintained, the tire was run at 30 mph for 1 hour. The following table, Table 1, depicts the results of the FMVSS test.

TABLE I

FMVSS Test Results

|  | Stage 1 | Stage 2 | Stage 3 |
|---|---|---|---|
| Test Speed | 42 mph | 48 mph | 30 mph |
| Air Pressure | 50 psi | 50 psi | deflated |
| Load | 4,000 lbs | 4,000 lbs | 4,000 lbs |
| Minutes Scheduled | 30 minutes | 30 minutes | 60 minutes |
| Minutes Completed | 30 minutes | 30 minutes | 12 minutes |
| Miles Completed | 21 miles | 24 miles | 6 miles |
| Test Observation | PASSED | PASSED | TEST SUSPENDED |
| Comments |  |  | Tread separated from tire carcass |

Accordingly, the run-flat support system performed excellently and at the end of the test, all components of the system were intact and operated as designed. Additionally, all the components met their requirements and could be reused for follow-on testing and further evaluation.

Testing Protocol: Ballistic Resistance. The run-flat support system described herein was subjected to ballistic resistance testing which is used as a design tool by manufacturers during the development and assessment of new designs with military applications. Multiple small caliber 150 grain, ballistic tip bullets were fired into the sidewall section of a tire equipped with the run-flat support system described herein. The bullets entered and exited the tire without destroying the run-flat system. Accordingly, the run-flat support system passed the ballistic resistance test.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A run-flat support system, comprising:
   a plurality of support segments positioned in a tire cavity of a pneumatic tired wheel, the plurality of support segments being abutted for an end-to-end mating engagement to provide a tubular support structure having an interior circumference defined by respective radial surfaces of the plurality of support segments;
   a plurality of fasteners for coupling the plurality of support segments in the end-to-end mating engagement;
   a torque assembly disposed within the interior circumference of the tubular support structure, the torque assembly including an integral and continuous substantially circular body and a plurality of mounting holes through the integral and continuous substantially circular body, the plurality of mounting holes being spaced to align with a plurality of wheel mounting holes associated with a split wheel rim;
   a peripheral flange coupled to an outer edge of the integral and continuous substantially circular body, the peripheral flange provided with a plurality of coupling holes spaced therearound for fastening the plurality of support segments to the peripheral flange; and
   the split wheel rim secured to the torque assembly.

2. The run-flat support system as recited in claim 1, wherein the split wheel rim comprises two wheel half-sections.

3. The run-flat support system as recited in claim 1, wherein the plurality of support segments remain substantially centered with respect to interior walls of the pneumatic tired wheel during a flat condition.

4. The run-flat support system as recited in claim 1, wherein the pneumatic tired wheel comprises a tire selected from the group consisting of radial ply tires and bias ply tires.

5. The run-flat support system as recited in claim 1, wherein each of the plurality of support segments comprises a crown member for engaging an inner wall of the pneumatic tired wheel in a flat condition.

6. The run-flat support system as recited in claim 1, wherein the tubular support structure engages the interior of the tubular structure between beads of the pneumatic tired wheel in the flat condition.

7. The run-flat support system as recited in claim 1, wherein the tubular support structure engages the interior of the tubular structure during a flat condition, the flat condition being selected from a group consisting of under-inflated conditions and deflated conditions.

\* \* \* \* \*